United States Patent [19]
Stone et al.

[11] Patent Number: 5,858,227
[45] Date of Patent: Jan. 12, 1999

[54] FUEL FILTER ASSEMBLY WITH IN-LINE VALVE

[75] Inventors: Walter H. Stone, Modesto; Michael D. Clausen, Turlock, both of Calif.

[73] Assignee: Parker-Hannifin Corporation, Cleveland, Ohio

[21] Appl. No.: 933,523

[22] Filed: Sep. 18, 1997

Related U.S. Application Data

[60] Provisional application No. 60/026,885 Sep. 23, 1996.

[51] Int. Cl.⁶ .................................................. B01D 35/157
[52] U.S. Cl. ........................... 210/234; 210/450; 210/454
[58] Field of Search ..................................... 210/234, 235, 210/454, 450, 418; 251/321; 96/399, 405

[56] References Cited

U.S. PATENT DOCUMENTS

| | | |
|---|---|---|
| 1,175,948 | 3/1916 | French . |
| 1,406,272 | 2/1922 | Morse . |
| 1,468,906 | 9/1923 | Inman . |
| 1,516,871 | 11/1924 | Stout . |
| 1,648,773 | 11/1927 | Lundborg . |
| 2,413,991 | 1/1947 | Newman . |
| 2,464,036 | 3/1949 | Hasselwander . |
| 3,061,105 | 10/1962 | Bradbury et al. . |
| 3,061,106 | 10/1962 | Bradbury . |
| 3,319,791 | 5/1967 | Horne . |
| 3,363,762 | 6/1968 | Ensign . |
| 3,970,566 | 7/1976 | Rosaen ..................................... 210/454 |
| 4,475,578 | 10/1984 | Nidle ........................................ 251/321 |
| 4,836,923 | 6/1989 | Popoff et al. . |
| 4,906,365 | 3/1990 | Baumann et al. . |
| 5,049,269 | 9/1991 | Shah . |
| 5,132,009 | 7/1992 | Futa, Jr. et al. . |
| 5,215,655 | 6/1993 | Mittermaier . |
| 5,336,406 | 8/1994 | Stanford et al. . |
| 5,670,042 | 9/1997 | Clausen et al. .......................... 210/454 |

FOREIGN PATENT DOCUMENTS 163252  12/1920  United Kingdom ................... 210/234

*Primary Examiner*—Matthew O. Savage
*Attorney, Agent, or Firm*—Christopher H. Hunter

[57] ABSTRACT

A fuel filter assembly (10) includes a housing (12) with an internal chamber (14) and inlet and outlet (18, 22). The chamber is bounded by an annular wall (16) and has an opening (30) at an upper end thereof. An element (26) is accepted in the chamber. The element includes a manually engagable cap portion (28) for closing the opening, and a disk-shaped member (46). The disk-shaped member has a deformable lip portion (50) for engaging the annular wall, and for fluidly separating an aperture (24) in connection with the outlet fitting, from aperture (24) in connection with the outlet fitting, from an aperture (20) in fluid communication with the inlet fitting. A check valve (200) is also engaged by the lip portion to open a fluid path to the chamber when the filter element is located in the housing. A media body (54) of filter media (56) removes impurities from liquid flowing therethrough. Fuel flows from the inlet to the chamber and then through the media. From an interior area (60) of the media body, the fuel passes through a passage (62) into an intermediate area (52) and out the outlet. An element change may be accomplished without spilling or contacting the fuel, and without contaminants in the chamber reaching the aperture in fluid communication with outlet.

29 Claims, 6 Drawing Sheets

FUEL FILTER ASSEMBLY WITH IN-LINE VALVE

This application claims the benefit of U.S Provisional Application No.: 60/026,885, filed on Sep. 23,1996.

FIELD OF THE INVENTION

This invention relates to fluid filters. Specifically, this invention relates to a fuel filter with a replaceable element that filters liquid fuel which is delivered to an engine of a self-propelled vehicle.

BACKGROUND OF THE INVENTION

Fuel filters of many types are known in the prior art. A popular type of fuel filter often used in trucks and other heavy vehicles is one that has a replaceable filter element. When in use, the element is housed in a filter housing. The housing is a permanent part of the vehicle fuel system.

Periodically the filter element in the assembly should be replaced. Prior art filter designs pose several drawbacks when it is necessary to change a filter element.

A common drawback associated with changing many types of prior art filter elements is that fuel is spilled out of the system into the environment during the element change. The loss of fuel not only poses a fire risk but is also an environmental problem.

Other prior art filter assemblies are made so that the person changing the filter must have their hands in contact with the fuel. Such contact, particularly on a repeated basis, is undesirable.

A further drawback of some prior art filter housings is that when the element is changed, dirt that has collected in the housing or on the element, is suspended or falls off the element into the fuel. The dirt may migrate into the outlet of the filter housing and travel downstream in the fuel system. Such dirt may cause serious problems to downstream components such as a carburetor, fuel injection pump or fuel injectors.

U.S. Pat. No. 4,836,923, which is owned by the assignee of the present invention, discloses a fuel filter assembly that overcomes these drawbacks. The filter element of that design may be changed without spilling fuel or requiring the person carrying out the filter change to have skin contact with the fuel. Further, the fuel filter assembly is designed so that the possibility of migration of contaminants into the outlet during an element change is minimized.

While the design shown in U.S. Pat. No. 4,836,923 works well, it is a relatively expensive item to manufacture. This is because the design includes a housing with integral passages as well as a standpipe. Further cost is added through the use of an end cap for the filter element which includes an integral seal. All of these features add complexity and cost to the design.

Thus, there exists a need for a fuel filter assembly with a replaceable element that has the desirable characteristics previously discussed, but is less expensive to manufacture.

SUMMARY OF THE PRESENT INVETION

It is an object of the present invention to provide a fuel filter assembly with a replaceable element that may be changed without spilling fuel into the environment.

It is a further object of the present invention to provide a fuel filter assembly with a replaceable element that may be replaced without spilling fuel or having skin contact with the fuel.

It is a further object of the present invention to provide a fuel filter assembly with a replaceable element that minimizes the risk that contaminants will pass out of the filter housing and reach downstream components of the fuel system as a result of an element change.

It is a further object of the present invention to provide a fuel filter assembly with a replaceable element that is relatively inexpensive to manufacture and service.

Further objects of the present invention will be made apparent in the following Best Modes of Carrying Out Invention and the appended claims.

The foregoing objects are accomplished in the preferred embodiments of the invention by a fuel filter assembly with a replaceable element. The fuel filter assembly has a housing with an inlet and an outlet. The housing also includes an internal chamber that is bounded circumferentially by an annular wall. The housing includes an opening at the top of the annular wall.

The inlet to the housing is in fluid communication with an aperture through the annular wall. A one-way check valve is disposed within the aperture of the inlet and spring-biased to a closed position. The outlet is in fluid communication with a further aperture through the annular wall, that is disposed from the first aperture vertically upward and angularly therefrom.

The filter assembly includes a replaceable element. The element includes a cap portion. The cap portion is sized for closing the opening to the chamber. The cap portion includes outwardly-directed threads which are adapted for engaging inwardly-directed threads which extend about the annular wall.

The element includes a dividing means that includes a lip portion. The lip portion engages the annular wall between the aperture that is in fluid communication with the outlet, and the aperture that is in fluid communication with the inlet, when the element is positioned in the housing. The lip portion also engages the one-way check valve in the inlet aperture when the element is positioned in the housing and moves the check valve to an open position. The dividing means also bounds an intermediate area through which fluid may flow to the aperture in fluid communication with the outlet.

A body comprised of filter media is attached to the disk-shaped member. The media body includes a ring of filter media for removing impurities in the fluid that flows therethrough. The media body encloses an interior area which houses fuel that has been purified by passage through the media. A fluid passage extends between the interior area of the media body and the intermediate area.

In operation, fuel enters the inlet of the housing and passes through the check valve and into the chamber through the aperture which is positioned below the lip portion of the dividing means. The fuel then passes through the media to the interior area of the media body. The clean fuel then passes upward through the fluid passage and flows through the intermediate area above the dividing means. Fuel then flows through the aperture above the lip portion and passes from the housing through the outlet.

The lip portion of the dividing means engages the annular wall and assures that fuel passing through the filter assembly must pass through the media to reach the outlet fitting. The check valve is also engaged by the lip portion and remains open when the element is located within the housing, but moves to a closed position, preventing fuel flow into the housing, when the element is removed. The dividing means also serves to keep impurities away from the aperture connected to the outlet when the element is being removed or installed. Both the housing and the element may be readily manufactured and serviced.

Further features of the present invention will become apparent to those skilled in the art upon reviewing the following specification and attached drawings.

DETAILED DESCRIPTION OF THE PREFERRED EMBODIMENT

Figure 1:
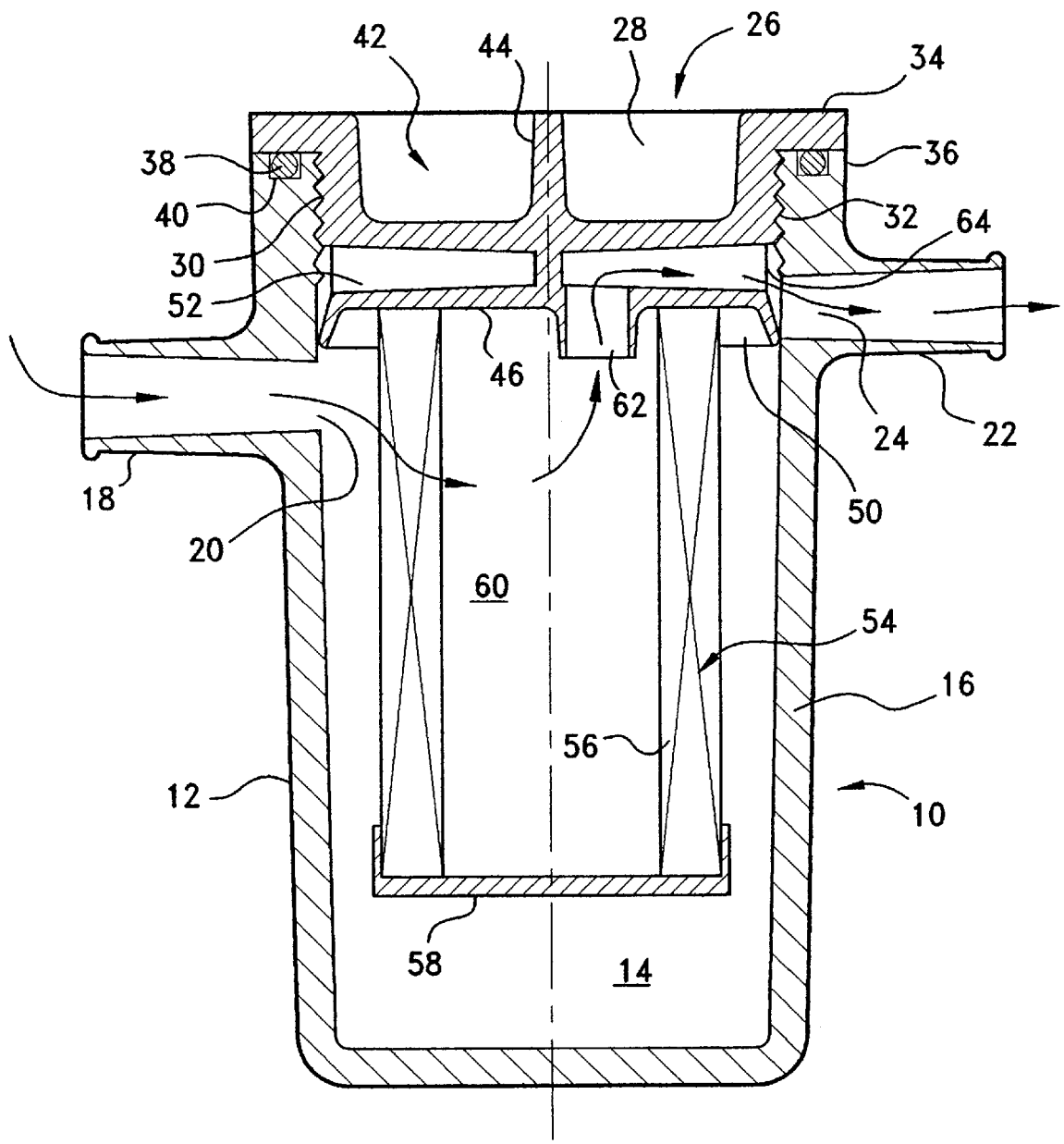
FIG. 1 is a cross-sectional view of the fuel filter assembly with replaceable element of a first embodiment of the present invention.

Housing 12 includes an inlet 18 for admitting fuel to chamber 14 through an aperture 20 in wall 16. Housing 12 further includes an outlet 22. Outlet 22 is in fluid communication with chamber 14 through a second aperture 24 in wall 16. Aperture 24 is disposed vertically above aperture 20, and is disposed angularly therefrom.

A replaceable element generally indicated 26, is mounted in housing 12. Element 26 includes a cap portion 28. Cap portion 28 is adapted for closing a circular opening 30 at the top of annular wall 16. Cap portion 28 includes external threads 32 for engaging threads which extend about the top of annular wall 16 adjacent the opening.

Cap portion 28 further includes a radially-extending flange portion 34. Flange portion 34 is adapted for overlying and engaging a rim portion 36 of housing 12 which extends circumferentially about opening 30. A seal 38 nests in a recess 40 which extends circumferentially about rim portion 36. Seal 38 maintains the cap portion of the element and the housing in fluid-tight relation when said element is installed therein.

Cap portion 28 further includes manually-engaging recesses 42 to facilitate holding and turning the cap portion. In the preferred form of the invention, the cap portion has two recesses divided by a projection 44.

Figure 3:
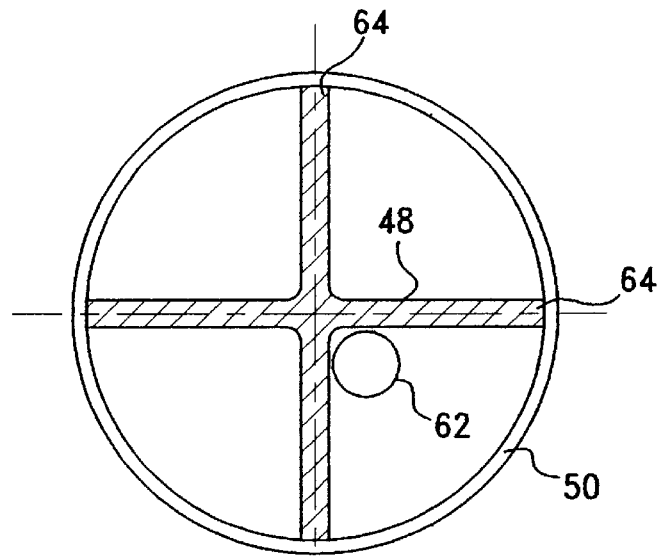
FIG. 3 is a cross-sectional view of the web of the element taken substantially along the plane described by the line 3—3 in FIG. 2.
Figure 2:
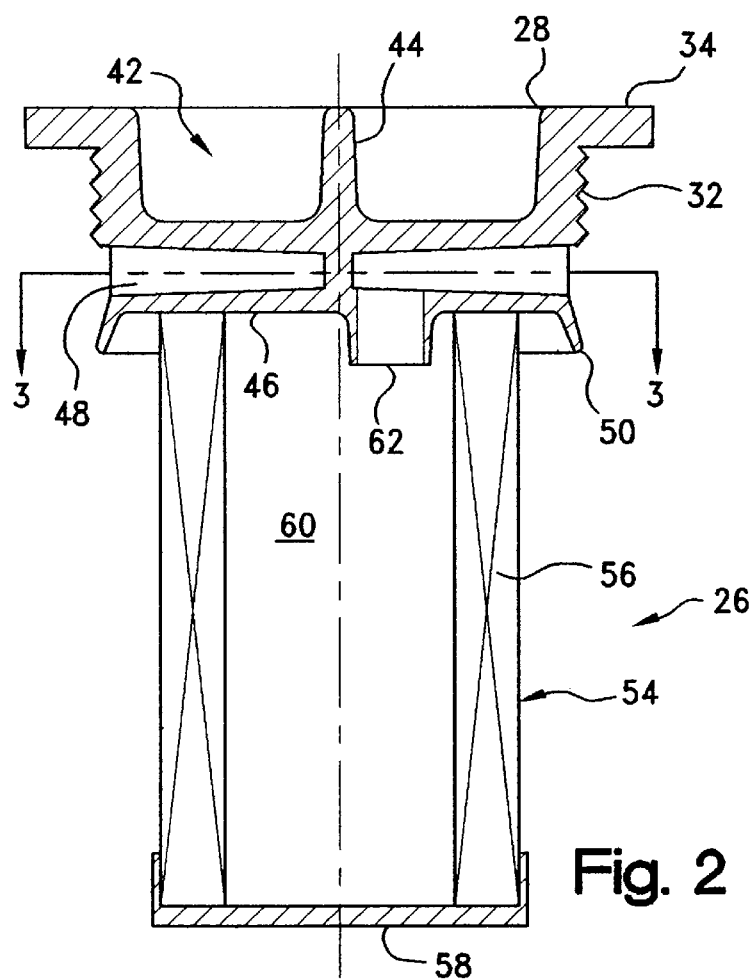
FIG. 2 is a cross-sectional view of the element shown in FIG. 1.

Element 26 further includes a disk-shaped member 46 which is disposed below cap portion 28 when the element is installed. In the embodiment shown, disk-shaped member 46 is held to cap portion 28 by a cross-shaped web 48 (see FIG. 3). Web 48 is preferably integrally formed with cap portion 28 and disk-shaped member 46, all of which are preferably made of plastic material.

Disk-shaped member 46 includes a lip portion 50 which extends radially outward and downward. Lip portion 50 is deformable and serves as engaging means for engaging annular wall 16 in a generally fluid-right relation about its fill circumferences. As a result, when element 26 is installed in housing 12, member 46 serves as dividing means and fluidly divides an area of the chamber 14 below the disk-shaped member, from an intermediate area 52 between the disk-shaped member and the cap portion.

Element 26 further includes a media body 54. Media body 54 includes a ring of filtration media 56 which is operable to remove impurities from the fuel as its flows therethrough.

The media body 54 is bounded at its lower end by an imperforate end cap 58. End cap 58 is secured to the media 56 by potting compound or other suitable adhesive sealant. Likewise, the upper end of media 56 is secured to member 46 by similar potting compound. As a result, the media surrounds an interior area 60 inside the media body 54, which interior area may be reached only by clean fuel that has passed through media 56.

Interior area 60 is in fluid communication with area 52 through a fluid passage 62 through member 46. Fluid passage 62 is disposed away from web 48. However, end walls 64 of the web are disposed away form the annular wall 16 when the element 26 in installed in the assembly. This enables fuel to flow without restriction about the entire outer circumference of area 52.

In operation, fuel such as diesel fuel which is used to power a diesel engine of a truck, is supplied from a tank or other source of supply to housing 12 through inlet 18. The fuel enters chamber 14 through aperture 20. The fuel from the chamber then flows through the media 56 to the interior area 60. As the fuel flows through the media, impurities are removed. These impurities, such as dirt and water, tend to drop to the bottom of chamber 14 from which they may be periodically removed through a drain valve or other device for removing impurities (not shown).

From the interior area 60, the clean fuel passes upward into area 52 through fluid passage 62 in disk-shaped member 46. Because lip portion 50 of member 6 engages annular wall 16 below aperture 24, clean fuel flows out of area 52 through aperture 24 and is delivered from the housing through outlet 22.

When element 26 is to be changed, cap portion 28 is manually engaged by recesses 42 and projection 44. The cap portion is rotated to disengage threads 32 from the threads on the wall adjacent opening 30. As the element is rotated, lip portion 50 of member 46 rubs against wall 46 shaking loose dirt that may have accumulated in the area of the annular wall under member 46.

As element 26 is rotated, it moves upward by action of the threads. Such upward movement causes the fuel level inside chamber 14 to fall. Once the threads are disengaged, removal of the element results in a further lowering of the fuel level inside the chamber. As a result, dirty fuel is maintained away from aperture 24. As the element is removed, the passage of lip portion 50 over aperture 24 also tends to keep impurities away and prevents them from passing to the outlet.

A new element in installed in the housing by inserting the element, media first into the chamber, and moving the element downward through opening 30. As element 26 moves downward, lip portion 50 engages wall 16 and is deformed inward to provide fluid-tight engagement. The wiping action of the lip portion over aperture 24 further helps to prevent impurities from flowing into the outlet.

The present invention enables an element change without skin contact with the fuel and without fuel spillage. The element change may also be achieved without dirty fuel passing to the outlet of the assembly.

The fuel filter assembly of the present invention may be readily manufactured which results in reduce cost. The housing is a design which may be readily cast of plastic or metal material. The housing design requires no special provisions for the inlet or outlet other than straight openings which are readily cast or machined.

The element of the first embodiment is readily made with the cap portion, web and disk-shaped member integrally formed of plastic material. In other embodiments of the invention, the bottom end cap may be held to the disk-shaped member with a fastening member instead of potting compound. This enables reuse of all the components of the element except for the media body. Such a construction may be desirable for purposes of reducing waste, and may be accomplished through use of suitable support rings for the media and seals to ensure that fuel is required to pass through the media to reach the interior area of the element.

Figure 4:
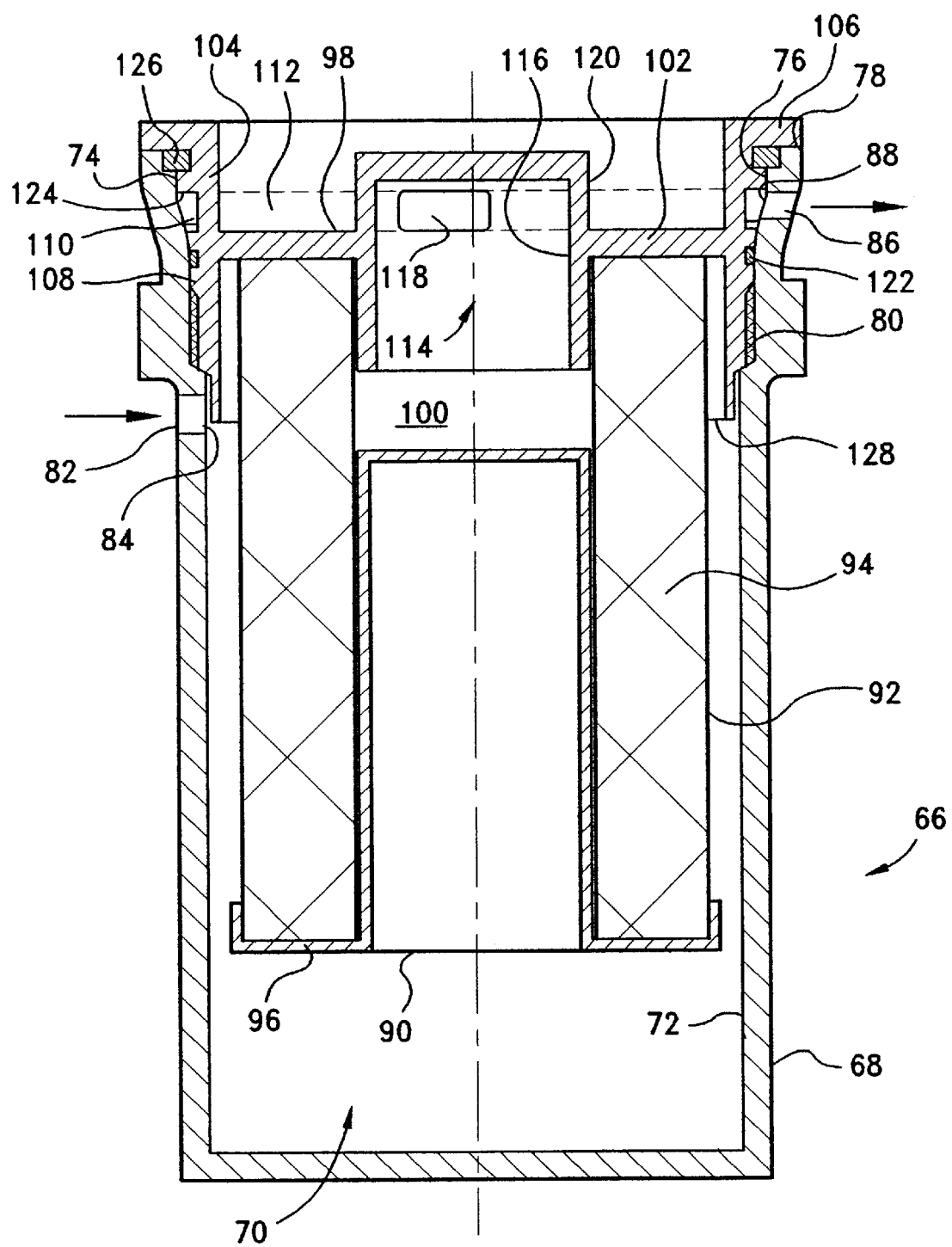
FIG. 4 is a cross-sectional side view of a second embodiment of the fuel filter assembly with replaceable element of the present invention.
Figure 5:
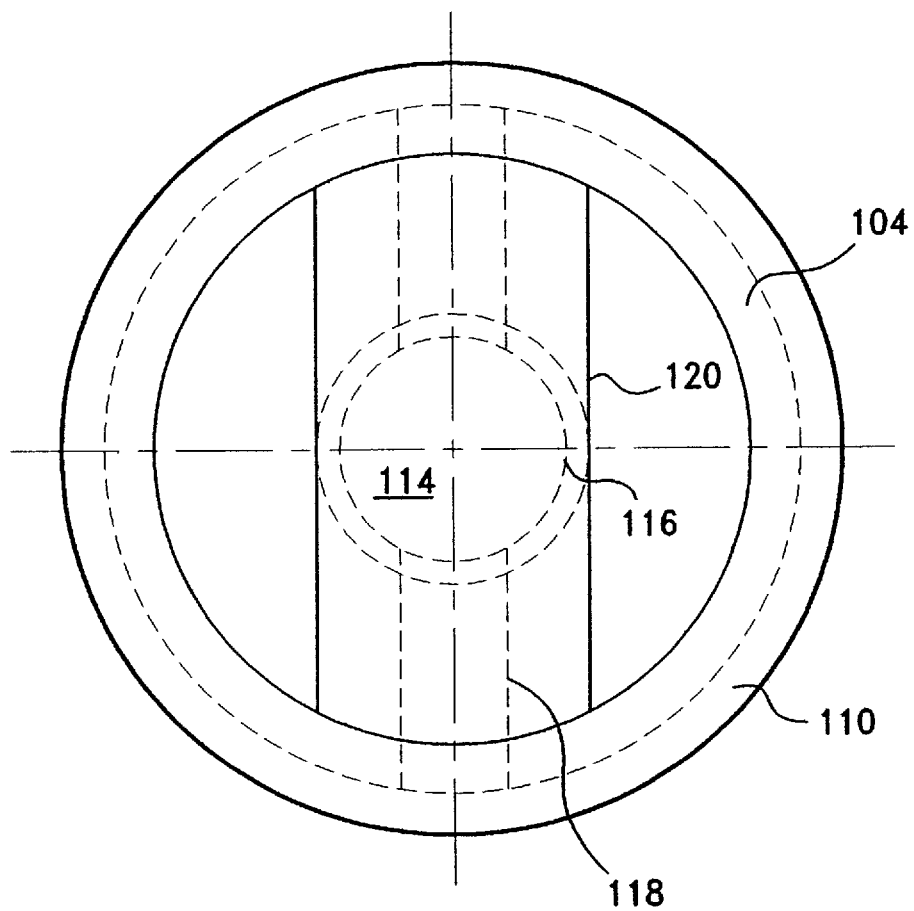
FIG. 5 is a top view of the assembly shown in FIG. 4.

A second embodiment of the invention is shown in FIGS. 4 and 5. The second embodiment is a filter assembly generally indicated 66. Assembly 66 has a housing 68, which has an internal chamber 70.

Chamber 70 is bounded interiorally by a lower annular wall 72 and an upper annular wall 74. Upper annular wall 74 is adjacent an opening 76 in the housing. Opening 76 is bounded by a radially-extending 78 A threaded area 80 extends in the housing between the upper and lower annular walls. Upper annular wall 74 is slightly larger in diameter than the lower annular wall 72.

An inlet opening 82 extends through housing 68. Inlet opening 82 is in fluid communication with a first aperture 84 in wall 72. An outlet opening 86 extends through housing 68 and is in fluid communication with a second aperture 88 in upper wall 74.

An element 90 is removably mounted in chamber 70. Element 90 includes a media body which is comprised of a continuous ring of filter media 94. The media body 92 is bounded at its lower end by an imperforate end cap 96 which is attached to the media by potting compound. The media is bounded at its upper end by a cap portion 98 which is also attached with potting compound. The ring of a media, end cap 96 and cap portion 98 enclose an interior area 100 of the element.

Cap portion 98 includes a disk-shaped portion 102. Disk portion 102 engages an annular upright portion 104 which terminates upwardly in a radially-extending flange portion 106 that overlies rim 78 when the element is installed.

Upright portion 104 includes an annularly-extending projection 108. Projection 108 engages upper annular wall 74, and serves as dividing means for dividing the area of the chamber 70 below projection 108 from an area 110 vertically above the projection. Area 110 is bounded by a circumferentially-extending recess 112 in upright portion 104 of cap portion 98. As shown in FIG. 4, recess 112 is aligned with second aperture 88 when element 90 is installed. As a result, area 110 is in direct fluid communication with outlet opening 86.

Cap portion 98 also includes an extending chamber 114 vertically above interior area 110 of the element. Chamber 114 is bounded by a circular wall 116. Wall 116 extends downward to support media 94, as well as upward. A pair of slots 118 extend radially-outward from chamber 114 (see FIG. 5). The slots place chamber 114 in fluid communication with area 110. The exterior of cap portion 98 includes a central rib 120 which facilitates manual engagement of the element.

Cap portion 98 also includes a resilient first circurnferentially-extending seal 122 which is housed in a recess in annularly-extending projection 108. Seal 122 has an outer lip (not separately shown) for engaging upper wall 74. A second annular projection 124 extends above recess 112 in the upright portion. Projection 124 engages wall 74 and further holds area 110 in fluid-tight relation. A second resilient seal 126, vertically above second projection 124, further seals area 110 and prevents leakage.

Upright portion 110 has a skirt area 128 below first projection 108. Skirt area 128 includes threads for engaging threaded area 80 of the housing. The skirt area is also disposed radially away from the outer surface of the media 94.

In operation, liquid fuel enters inlet opening 82 and flows into chamber 70 through first aperture 84. The liquid passes through the media 94 of media body 92 to the interior area 100. The passage of the liquid through the media removes contaminants.

The clean fuel passes into extending chamber 114 and flows outward through slots 118. The fluid flows from the slots into area 110 bounded by recess 112. The liquid flows circumferentially through area 110 and passes into second aperture 88. Fluid flowing out second aperture 88 1 eaves the housing through outlet opening 86.

The embodiment shown in FIGS. 4 and 5 has the advantage that the aperture in fluid communication with the outlet is vertically and radially disposed from the level of the dirty fuel in the housing when the element is removed. The position of the first seal 122, threaded area 80 and skirt area 128 also serve to keep contaminants away from aperture 88. As in the first embodiment, the element of the second embodiment may be changed without spilling fuel into the environment.

A third embodiment of the invention is shown in FIGS. 6–9. The third embodiment has a filter assembly, indicated generally at 150. Assembly 150 has a housing 152 with an internal chamber 154. Chamber 154 is bounded by an annularly-extending sidewall 156.

Housing 152 includes an inlet 160 for admitting fuel to chamber 154 through an aperture 162 in wall 156. Housing 152 further includes an outlet 164 which is in fluid communication with chamber 154 through a second aperture 166 in wall 156. As in the first embodiment, aperture 166 is disposed vertically above aperture 162, and is disposed angularly therefrom.

Also as in the first embodiment, a replaceable element, generally indicated at 170, is mounted in housing 152. Element 170 includes a cap portion 172 adapted for closing a circular opening 174 at the top of annular wall 156. Cap portion 172 includes external threads 176 for engaging corresponding threads which extend about the top of annular wall 156 adjacent the opening. Cap portion 172 further includes a radially-extending flange portion 178 which engages a radially-extending step portion 180 on wall 156. Seal 182 is disposed between step portion 180 and flange portion 178 to provide a fluid-tight seal therebetween.

Cap portion 172 fluther includes recesses 184 divided by a projection 186 to facilitate holding and turning the cap portion.

Element 152 further includes a disk-shaped member 190 which is disposed below cap portion 172 when the element 170 is installed in the housing 152. Disk-shaped member 190 is held to cap portion 172 by a cross-shaped web 192, which is integrally formed with cap portion 172 and disk-shaped member 190. Disk-shaped member 190 further includes an annular lip portion 194 (see FIG. 8) which extends radially outward and downward from member 190. Lip portion 194 is deformable and serves as engaging means for engaging annular wall 156 in a generally fluid-tight relation about its full circumference. Preferably a generally radially-outward extending flange or rib 196 is provided between the midpoint and the lower distal end of lip portion 194. Rib 196 resiliently engages the inner surface of wall 156 to provide a fluid-tight seal therewith.

Figure 9:
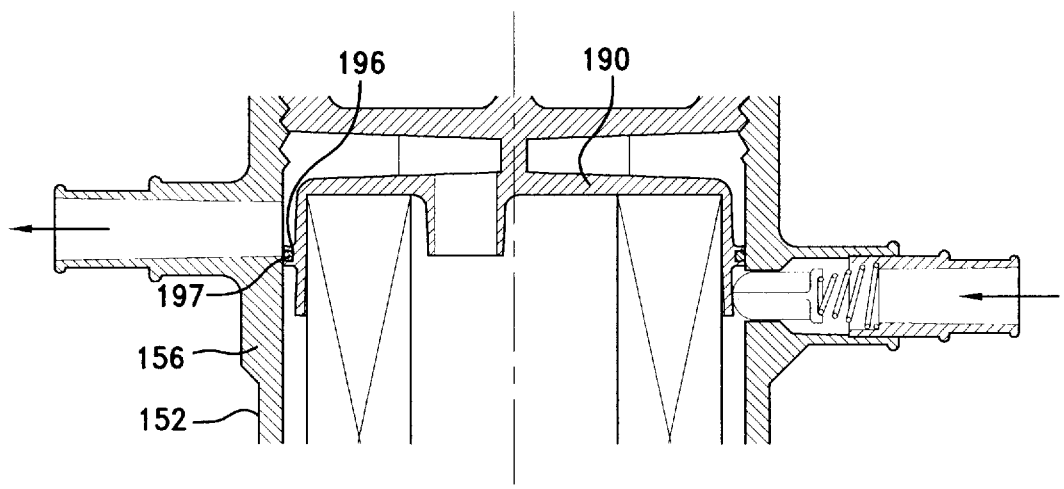
FIG. 9 is a cross-sectional side view of a further form of the third embodiment of the element shown in FIG. 6.

Alternatively, as shown in FIG. 9, rib 196 can include an elastomeric O-ring 197 carried in an annular groove or channel formed in the radially outer end of rib 196. O-ring 197 likewise provides a fluid-tight seal against the inside surface of wall 156.

As in the first embodiment, when element 170 is installed in housing 152, member 190, and in particular rib 196, serves as dividing means and fluidly divides an area of the chamber 154 below the disk-shaped member, from an intermediate area 198 between the disk-shaped member and the cap portion.

Figure 8:
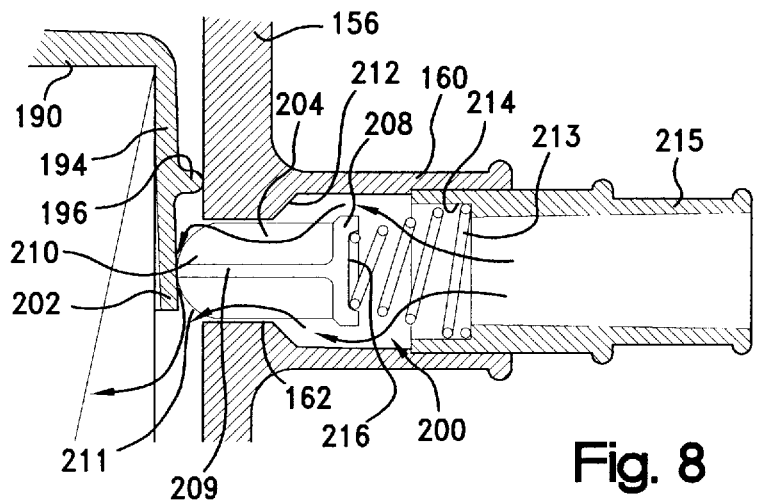
FIG. 8 is an enlarged, cross-sectional side view of a portion of the element of FIG. 6.

As shown most clearly in FIG. 8, lip portion 194 also engages a one-way check valve, indicated generally at 200, disposed within aperture 162 of inlet 160. Specifically, the distal end 202 of lip 194, which is spaced axially downward from rib 196, engages elongated valve member 204 of check valve 200 and moves member 204 radially outward. Valve member 204 includes an annular, outwardly-extending shoulder 208 at one (upstream) end, and equally-spaced ribs or flanges 209 extending from shoulder 208 along the length of the cylindrical body 211 of the valve member to the other (downstream) rounded or tapered end 210. Ribs or flanges 209 provide a space between valve member 204 and aperture 162 for fluid flow therebetween, and maintain the alignment of the valve member in the aperture during movement. The valve member 204 of check valve 200 is preferably formed (molded) in one piece from plastic or other appropriate material.

Valve member 204 is normally biased against a valve seat 212 by spring 213, and projects radially inward a slight distance into chamber 154. Spring 213 preferably comprises a compression spring retained within inlet 160 and extending between a counterbore 214 formed in annular inlet fitting 215, and counterbore 216 formed in the otherwise flat upstream end of the valve member 204. Fitting 215 can be secured within inlet 160, for example with outwardly-directed threads which engage corresponding inwardly-directed threads in the fitting. This threaded attachment allows fitting 215 to be easily inserted or removed for inspection and replacement of valve member 204. Valve member 204 can also be easily removed entirely from the inlet if not required. In any case, when valve member 204 is installed and element 170 is inserted into housing 152, the distal end portion 202 of lip 194 forces valve member 204 radially outward against spring 206 such that a fluid path is provided between annular shoulder 208 and annular valve seat 212 to allow fluid to flow through inlet 160.

When element 170 is removed from housing 152, spring 213 biases valve member 204 into a closed position. Shoulder 208 of the valve member seats and fluidly seals firmly against valve seat 212. Shoulder 208 and valve seat 212 have corresponding angled surfaces to affect the fluid seal. Fluid pressure against the upstream end of valve member 204 also tends to bias valve member 204 to a closed, fluid-tight position.

Figure 6:
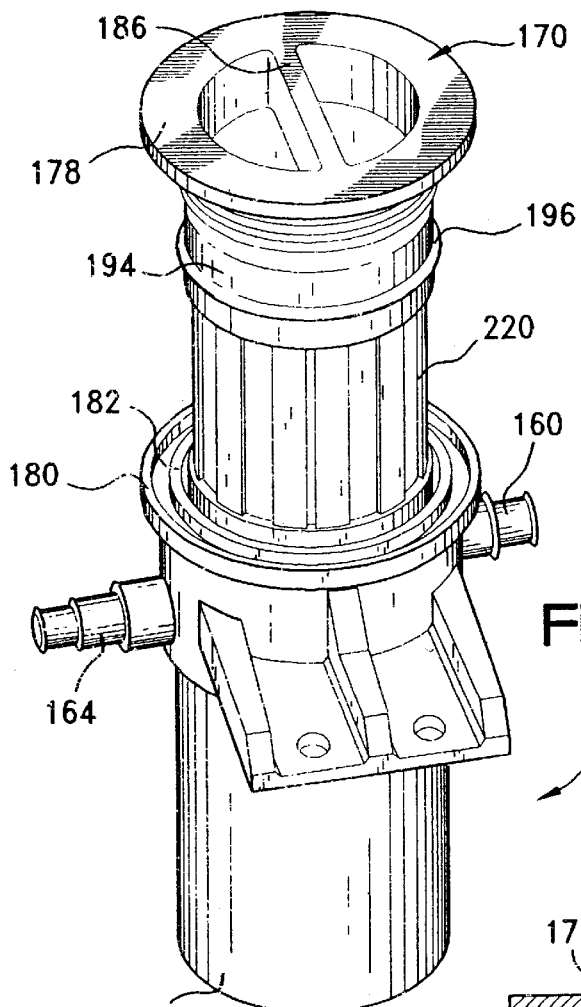
FIG. 6 is a perspective view of a third embodiment of the fuel filter assembly with replaceable element of the present invention.
Figure 7:
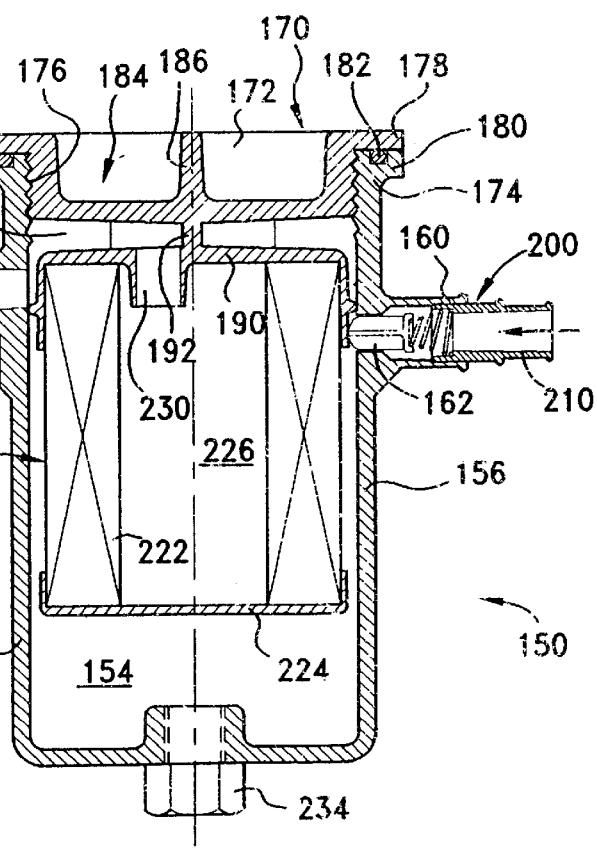
FIG. 7 is a cross-sectional side view of the element shown in FIG. 6.

As in the previous embodiments, element 170 further includes a media body, indicated generally at 220 in FIGS. 6 and 7. Media body 220 includes a ring of filtration media 222 which is operable to remove impurities from fuel as its flows therethrough. Media body 220 is bounded at its lower end by an imperforate end cap 224, and at its upper end by disk-shaped member 190. Media 22 surrounds an interior area 226 inside media body 220. Interior area 220 is in fluid communication with area 198 through a fluid passage 230 in member 190.

In operation, the fuiel path through assembly 150 is the same as in the first embodiment, that is, when element 170 is disposed within housing 152, check valve 200 is in an open position, and fuel enters chamber 154 through aperture 162. The fuel from the chamber then flows through media 222 to the interior area 226. Impurities are removed in the media, and tend to drop to the bottom of chamber 154 where they may be periodically removed through a drain valve, such as indicated at 234. From the interior area 226, the clean fuel passes upward into area 198 through passage 230 in disk-shaped member 190, and then out through aperture 166 and delivered from the housing through outlet 164. Lip portion 194, and in particular rib 196 (FIG. 8) or O-ring seal 197 (FIG. 9) engages annular wall 156 to separate the dirty fuel entering inlet 160 from the clean fuel exiting outlet 164.

If element 170 is removed from housing 152, check valve 200 moves to a closed position, and prevents fuel from passing through inlet 160. Check valve 200 operates regardless of the angle of filter assembly 150, is simple to assemble and inspect, and contains relatively few parts which are easy to manufacture and are of relatively low cost. The present invention thereby enables a filter change without additional fuel entering housing 152, and thereby prevents spilling of the fuel or contact of the fuel with the operator's hands. If drain 234 is open prior to an element change, practically no fuel will be lost from the system when element 170 is removed.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter comprising:

a housing including a filter chamber, the housing including an opening to said filter chamber, said filter chamber bounded by a generally longitudinally-extending, imperforate annular wall adjacent said opening;

first fluid port and a second fluid port into said filter chamber;

one of said fluid ports including a valve member normally spring-biased into a closed position to block fluid flow through said one port;

a removable filter element in said filter chamber, said filter element having a ring of filter media, said ring defming an interior area and an exterior area in said filter chamber;

said filter element further including a disk-shaped member attached to a first end of said filter media ring, said disk-shaped member having unitary therewith an annular lip portion extending axially from said disk-shaped member toward a second end of said filter element and circumferentially surrounding an axial extent of the filter media ring, said lip portion also projecting radially outward from the media ring and sealingly engaged circumferentially around said annular wall to fluidly separate said interior area from said exterior area of said filter chamber such that said first port is fluidly connected to said interior area and said second port is fluidly connected to said exterior area, said lip portion also engaging said valve member and positioning said valve member in an open position to allow fluid flow through said one port.

2. The filter as in claim 1, wherein said lip portion includes a generally radially-outward projecting annular rib extending circumferentially around the lip portion, said rib engaging circumferentially about an inner surface of said annular wall.

3. The filter as in claim 2, wherein said lip portion further includes a resilient O-ring seal disposed in an annular groove formed in a radially outer end of said rib and extending along the circumferential extent of said rib.

4. The filter as in claim 1, wherein said valve member is movable between a first position whereby the valve member forms a fluid-tight seal within said one port, and a second position wherein the valve member provides a flow path through said one port, and biasing means for biasing said valve member into said first position.

5. The filter as in claim 4, wherein said valve member is disposed within said one port, and has a portion which extends inwardly from said port into said chamber of said housing when said valve member is in said first position.

6. The filter as in claim 5, wherein said one fluid port confines said valve member to movement in a radial direction with respect to a geometric axis that is coaxial with respect to the annular wall of said housing.

7. The filter as in claim 6, wherein said valve member comprises a cylindrical body having an outwardly-projecting shoulder at one end for forming the fluid-tight seal with said one port when said valve member is in said closed position.

8. The filter as in claim 7, wherein said valve member further includes longitudinally-extending ribs along the cylindrical body from the shoulder to another end of the cylindrical body for aligning the valve member within the port when the valve member moves from said open to said closed position.

9. The filter as in claim 1, wherein said disk-shaped member is imperforate and includes an opening into the interior area of the filter media ring, a flow path defined from the one port into the exterior area, radially inward through the media ring and into the interior area, through the opening in the disk-shaped member and through the other port.

10. The filter as in claim 1, wherein said lip portion includes a resilient annular sealing device bounding the periphery of said lip portion and projecting radially-outward therefrom.

11. The filter as in claim 10, wherein said sealing device includes an annular rib extending circumferentially around the lip portion, said rib engaging circumferentially about an inner surface of said annular wall, the lip portion having an annular portion extending further axially from the annular rib toward the second end of the filter media ring for engaging the valve member.

12. The filter as in claim 10, wherein said sealing device includes a resilient O-ring seal disposed in an annular groove surrounding the lip portion, the lip portion having an annular portion extending further axially from the O-ring seal toward the second end of the filter media ring for engaging the valve member.

13. A filter, comprising:

a housing including a chamber, the housing including an opening to said chamber, the chamber bounded by a generally longitudinally-extending, imperforate annular wall adjacent said opening;

a first fluid port and a second fluid port into said chamber, said first fluid port and second fluid port being disposed in a cylindrical sidewall of said housing and extending radially outward therefrom; and one of said ports including a valve member normally biased into a closed position to block fluid flow through said one port via a biasig means, said valve member extending into said chamber for engagement by a filter element and for movement to an open position by the filter element when the filter element is located within the chamber of said housing to allow fluid flow through said one port, said filter element including a ring of filter media, and a disk-shaped member attached to an end of said filter media ring, said disk-shaped member having unitary therewith an annular lip portion extending axially from said disk-shaped member along an axial extent of the filter media ring toward another end of the filter media ring and circumferentially surrounding the filter media ring, said lip portion projecting radially outward from the filter media ring and sealingly engaged circumferentially about said annular wall of the chamber, said lip portion also engaging said valve member and positioning said valve member in the open position to allow fluid flow through the one port.

14. The filter as in claim 13, wherein said valve member is movable between a first position whereby the valve member forms a fluid-tight seal within said one port, and a second position wherein the valve member provides a flow path through said one port, and biasing means for biasing said valve member into said first position comprising a spring.

15. The filter as in claim 14, wherein said one port confines said valve member to movement in a radial direction with respect to a geometric axis that is coaxial with respect to the annular wall of said housing.

16. The filter as in claim 13, wherein said lip portion includes a resilient annular sealing device bounding the periphery of said lip portion and projecting radially-outward therefrom.

17. The filter as in claim 16, wherein said sealing device comprises an annular rib extending circumferentially around the lip portion, said rib engaging circumferentially about an inner surface of said annular wall, the lip portion having an annular portion extending further axially from the annular rib toward the other end of the filter media ring for engaging the valve member.

18. The filter as in claim 16, wherein said sealing device includes a resilient O-ring seal disposed in an annular groove surrounding the lip portion, the lip portion having an annular portion extending further axially from the O-ring seal toward the second end of the filter media ring for engaging the valve member.

19. The filter as in claim 13, wherein said disk-shaped member is imperforate and includes an opening, a flow path defined from the one port into the exterior area, radially inward through the media ring and into an interior area of the filter media ring, through the opening in the disk-shaped member and through the other port.

20. A filter comprising:

a housing including a filter chamber, the housing including an opening to said filter chamber, said filter chamber bounded by a generally longitudinally-extending, imperforate annular wall adjacent said opening;

a first fluid port and a second fluid port into said filter chamber;

said second fluid port including a valve member normally spring-biased into a closed position to block fluid flow through said second port;

a removable filter element in said filter chamber, said filter element having a ring of filter media and a disk-shaped imperforate end member bonded by a mass of adhesive to each end of the media ring, said ring defining an interior area and an exterior area in said filter chamber;

one of said disk-shaped members having unitary therewith an annular lip portion extending axially from said one disk-shaped member toward the other disk-shaped member, said lip portion having a resilient annular sealing device projecting radially outward from the filter media ring and engaged circumferentially around said annular wall to fluidly separate said interior area from said exterior area of said filter chamber such that said first port is fluidly connected to said interior area and said second port is fluidly connected to said exterior area, said lip portion also engaging said valve member and positioning said valve member in an open position to allow fluid flow through said second port.

21. The filter as in claim 20, wherein the annular lip portion circumferentially surrounds an axial extent of the filter media ring, the remainder of the filter media ring being unobstructed by the lip portion to allow fluid flow therethrough.

22. The filter as in claim 21, wherein the lip portion surrounding the axial extent of the filter media ring is radially outwardly-spaced apart from the filter media ring, whereby said lip portion is free to deform radially inward.

23. The filter as in claim 20, wherein said sealing device includes an annular rib extending circumferentially around the lip portion, said rib engaging circumferentially about an inner surface of said annular wall, the lip portion having an annular portion extending further axially from the annular rib toward the other disk-shaped member for engaging the valve member.

24. The filter as in claim 23, wherein the annular portion extending further axially from the annular rib is continuous and free of any fluid passage opening.

25. The filter as in claim 20, wherein said sealing device includes a resilient O-ring seal disposed in an annular groove surrounding the lip portion, the lip portion having an annular portion extending further axially from the O-ring seal toward the other disk-shaped member for engaging the valve member.

26. The filter as in claim 25, wherein the annular portion extending further axially from the O-ring seal is continuous and free of any fluid passage opening.

27. The filter as in claim 20, wherein said one disk-shaped member includes an opening into the interior area bounded by the filter media ring.

28. The filter as in claim 27, further including a circular end cap portion enclosing the opening to the housing, the one disk-shaped member being connected to said end cap portion, and the other disk-shaped member being spaced from said end cap portion, an intermediate flow area provided between the one disk-shaped member and the end cap portion to fluidly interconnect the opening in the one disk-shaped member and the first fluid port.

29. The filter as in claim 28, wherein an annular recess is provided between said one disk-shaped member and said end cap portion, and said first fluid port opens into said annular recess.

* * * * *

UNITED STATES PATENT AND TRADEMARK OFFICE
CERTIFICATE OF CORRECTION

PATENT NO. : 5,858,227
DATED : Jan. 12, 1999
INVENTOR(S) : Walter H. Stone and Michael D. Clausen It is certified that error appears in the above-identified patent and that said Letters Patent is hereby corrected as shown below:

Column 8, Line 58, the word "defming" should be "defining".

Signed and Sealed this

Twentieth Day of April, 1999

Attest:

Q. TODD DICKINSON

Attesting Officer

Acting Commissioner of Patents and Trademarks